(12) United States Patent
Noguchi et al.

(10) Patent No.: US 7,565,687 B2
(45) Date of Patent: Jul. 21, 2009

(54) TRANSMISSION CONTROL SYSTEM, SERVER, TERMINAL STATION, TRANSMISSION CONTROL METHOD, PROGRAM AND STORAGE MEDIUM

(75) Inventors: Tetsuya Noguchi, Yamato (JP); Naishin Seki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1551 days.

(21) Appl. No.: 10/158,806

(22) Filed: May 31, 2002

(65) Prior Publication Data

US 2003/0154296 A1 Aug. 14, 2003

Related U.S. Application Data

(60) Provisional application No. 60/355,527, filed on Feb. 8, 2002.

(51) Int. Cl.
*G06F 7/58* (2006.01)
(52) U.S. Cl. .......................................................... 726/3
(58) Field of Classification Search ................ 713/193; 726/3, 27; 709/225
See application file for complete search history.

(56) References Cited

U.S. PATENT DOCUMENTS

| | | | | |
|---|---|---|---|---|
| 5,832,212 A | * | 11/1998 | Cragun et al. .................. 726/2 |
| 6,219,786 B1 | * | 4/2001 | Cunningham et al. ....... 713/152 |
| 6,233,618 B1 | * | 5/2001 | Shannon ..................... 709/229 |
| 6,240,493 B1 | * | 5/2001 | Hardwood et al. .......... 711/163 |
| 6,539,430 B1 | * | 3/2003 | Humes ........................ 709/225 |

* cited by examiner

*Primary Examiner*—Emmanuel L Moise
*Assistant Examiner*—Ali S Abyaneh
(74) *Attorney, Agent, or Firm*—Ryan, Mason & Lewis, LLP

(57) ABSTRACT

A transmission control system comprises a restricted word database for storing restricted words; a request transmission control section for relaying a request message sent from a Web browser to an external network and inspecting whether the request message includes a code that is dependent on an HTML file; and a restricted word checking section for analyzing the code using related portions of the code described in the HTML file when the request message includes the code, and determining whether or not to allow transmission of the request message depending on whether an analysis result of the code corresponds to the restricted words, wherein the request transmission control section controls the transmission of the request message according to the determination of the restricted word checking section.

19 Claims, 11 Drawing Sheets

| User ID | Password | Restricted word 1 | Restricted word 2 |
|---|---|---|---|
| aaa | abcdefgh | Yamato City Tyuorinkan Shimotsuruma | 1234567890 |
| bbb | stuvwxyz | Kanagawa Tyuorinkan | 0123456 |

```
<FORM action="address.cgi" method="get">
<SELECT name="A">
<OPTION value="a">Tokyo
<OPTION value="b">Kanagawa prefecture
</SELECT>
<SELECT name="B">
<OPTION value="a">Yamato City
</SELECT>
<SELECT name="C">
<OPTION value="a">Tyuorinkan
</SELECT>
<INPUT type="submit" value="Send ">
</FORM>
```

(a)

```
<FORM action="default.cgi" method="get" name="query">
<INPUT type="submit" value="Retrieve">
<SELECT name="WTS">
<OPTION value="tk">Tokyo
<OPTION value="kg">Kanagawa prefecture
</SELECT>
</FORM>
```

(b)

```
get http://abc/default.cgi?WTS=tk
```

Fig. 13

TRANSMISSION CONTROL SYSTEM, SERVER, TERMINAL STATION, TRANSMISSION CONTROL METHOD, PROGRAM AND STORAGE MEDIUM

CROSS REFERENCE TO RELATED APPLICATIONS

This application claims the benefit of U.S. Provisional Application No. 60/355,527, filed Feb. 8, 2002, the disclosure of which is hereby incorporated by reference.

FIELD OF THE INVENTION

The present invention relates generally to communication over networks and specifically to preventing the outflow of predetermined information when sending information to external networks from a computer apparatus.

BACKGROUND ART

Today, along with the popularization of the Internet and WANs (Wide Area Networks), an increasing number of users are utilizing the Internet, even in schools and homes. In the utilization of public facilities such as schools and homes, it is often the case that the same computer is shared by a plurality of persons to connect to the Internet.

Additionally, there are a wide variety of services on Web sites that are connected over the Internet. Some of these services include those that are provided by sending personal data to agents who exhibit the contents or those that are provided by paying money utilizing a credit card or the like.

In such an environment, where a computer apparatus is shared by a plurality of users as described above, one of the users may send personal information of other users to the external network (e.g., the Internet) or may do some shopping of his or her own by using a credit card of other persons of a family in a home. Accordingly, there is a need for a system that prevents others from sending such personal information or specific information.

Conventionally, one way to prevent others from sending such personal information to the external network is to use a filtering function of a proxy server. The proxy server is a server that is installed between the external network, such as the Internet, and the internal network, such as a Local Area Network (LAN), and prevents dishonest invasions into the internal network. Additionally, a proxy server relays and manages the access from the internal network to the external network. Accordingly, the security in the internal network is established and the traffic needed for accessing the external network is reduced, thereby enabling fast accesses.

Using the filtering function of the proxy server, it is possible to prevent personal information from flowing out to the external network by retaining Uniform Resource Locators (URLs) of the Web sites that may require personal information in the proxy server and restricting accesses to these URLs.

Another way to prevent others from sending personal information or the like to the external network is to delete specific tags from HyperText Markup Language (HTML) documents that have been received from the external network in order to prevent the information transmission. The structure of HTML documents, which are the documents of Web pages, is described by a combination of tags, wherein the function for information transmission from a client machine is defined by tags as well. Therefore, by deleting the tags used for information transmission, by using the filtering function of the proxy server when the browser displays Web pages on the display of the client machine, it is unlikely that information will be sent from the client machine to the external network.

A further way to prevent others from sending personal information or the like to the external network is to filter the request message sent from the client machine to the external network. A widely used request message is a HyperText Transfer Protocol (HTTP) request. In this type of filtering, words and URLs that restrict transmission have been set in advance, wherein if a request message includes the word or URL that restricts transmission when it is sent from the client machine, the request message is prohibited from being transmitted. The check for request messages may be established as a function of the proxy, Operating System (OS), browser, or other suitable device.

However, those methods described above for preventing others from sending personal information or the like to the external network will have the following problems. The method for restricting the access to the specific URL using the filtering function of the proxy server rejects the access itself to the contents with that URL; therefore, it cannot cope with the case of restricting only the transmission of personal information and still the viewing of contents of the Web page associated with the URL. Furthermore, along with the popularization of network environments such as the Internet, as it is expected that the contents that need personal information such as identifications (IDs) and credit card numbers will increase, it is impractical to search for all the contents that may make information flow out and to filter all the corresponding URLs.

As to the method for deleting the specific tags from HTML documents that have been sent from the external network, this method needs to perform filtering for the specific URL; thus it cannot cope with the increase of URLs that need personal information, as with the case of restricting the access to the specific URL as described above. Also, as to the method for filtering the request message sent from the client machine to the external network, there are cases where the words whose transmission is restricted are replaced in the request message, whereby this method fails to restrict the transmission.

In order to explain such a situation, a mechanism for generating a request message, which is the information sent from the HTML document, will now be described. FIG. 13 is a diagram illustrating a request message, which is the information sent to the HTTP from the FORM tag portion displayed in the browser of the client machine.

FIG. 13(a) represents part of an HTML document, which is the source of a Web page displayed in the browser of the client machine. It is noted that there are elements for a user's inputting or selecting operations, such as <INPUT>, <SELECT> and <OPTION>, arranged within a portion from <FORM> to </FORM>.

In this Web page, when a user pushes a send button where type="submit" is specified, the contents of information selected in the form is sent to the Common Gateway Interface (CGI) program of the URL specified by the "action" attributes. In the case of FIG. 13(a), it is sent to "default.cgi" when selecting "Tokyo" on the Web page displayed in the browser of the client machine. Using the HTML document shown in FIG. 13(a), a value "tk" is returned to the SELECT object "WTS", resulting in WTS=tk. That is an HTTP request message shown in FIG. 13(b), i.e., "get http://abc/default.cgi?WTS=tk" is issued.

Therefore, even in the case where "Tokyo" is set as a word for restricting the transmission and a word "Tokyo" is actually input in the input form of Web page, this request message is not able to be prevented from being transmitted, because the information sent as the request message is replaced with the information such as "WTS=tk". Besides, this replaced information can be arbitrarily set in the HTML document using the OPTION tags as shown in FIG. 13(a).

Accordingly, when attempting to restrict the transmission of a word "Tokyo", it is practically impossible to set words in advance that restrict the transmission by supposing all replaced information. There is therefore a need to reliably prevent request messages from being transmitted.

SUMMARY OF THE INVENTION

The present invention solves the problems associated with the prior art by preventing request messages, which include a word or words whose transmission is restricted, from being transmitted. Aspects of the present invention analyze HTML documents received from a server, determine analysis information, and determine whether the information to be transmitted includes the word or words whose transmission is restricted by using the analysis information. The request message or messages are prevented from being transmitted when a word or words whose transmission is restricted are found.

In one aspect of the invention, broadly, restricted word database is used to store restricted words that are set to restrict transmission. Additionally, a request message, sent from a Web browser to an external network, is relayed to the network and the request message is inspected for a code that is dependent on a source file of a Web page displayed on the Web browser. Also, the code is analyzed using related portions of code described in the source file when the request message includes the code, and it is determined whether or not to allow transmission of the request message. The latter determination depends on whether an analysis result of the code corresponds to the restricted words stored in the restricted word database, wherein the transmission of the request message is controlled according to this determination.

The code described above is, for example, an attribute name defined in a form, which is included in query data in the request message. Alternatively, the source file may be analyzed in advance in order to acquire and store information about this code. For this purpose, another aspect of the invention has an information database that stores information about corresponding relations between the code extracted from the source file of the Web page displayed in the Web browser and attribute values of the code.

An additional aspect of the invention acquires a source file of a Web page sent back from a predetermined server responsive to a request from the Web browser, and extracts corresponding relations between the code in the source file and attribute values of the code and storing in the corresponding information database.

In another aspect of the invention, a user who has logged into the Web browser is specified, and restricted words are set individually for each user who uses the Web browser. Additionally, restricted words may be associated with time zones, which allows restriction based on present time.

A more complete understanding of the present invention, as well as further features and advantages of the present invention, will be obtained by reference to the following detailed description and drawings.

BRIEF DESCRIPTION OF THE DRAWINGS

FIG. 7 depicts an example of a corresponding table used in the embodiment of the present invention, wherein FIG. 7(a) depicts a form reference table 21, while

FIG. 13 is a diagram illustrating a request message sent from the form portion displayed in the browser of the client machine.

DETAILED DESCRIPTION OF PREFERRED EMBODIMENTS

Figure 1:
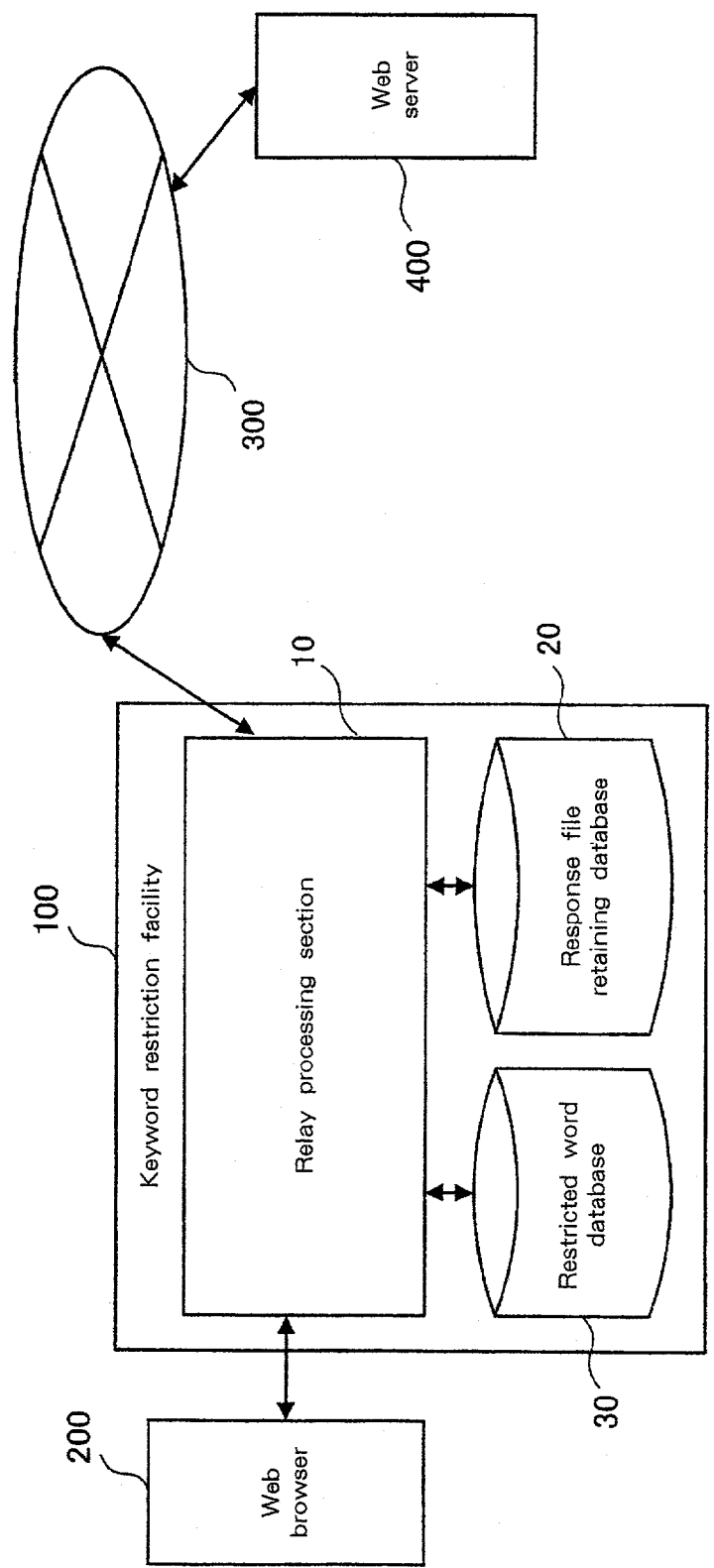
FIG. 1 is a diagram depicting a configuration of the keyword restriction facility according to an embodiment of the present invention.

Now the present invention will be described with reference to the accompanying drawings. FIG. 1 is a diagram depicting a configuration of the keyword restriction facility (e.g., a system) according to an embodiment of the present invention. In the embodiment, an example, information is sent from a client machine connected to the Internet through a form of a Web page to a predetermined server. However, the present invention is applicable to an access to an external network.

Keyword restriction facility 100 shown in FIG. 1 is established between Web browser 200 on a client machine and the Internet 300. Connected to the Internet 300 is Web server 400, which provides various services. That is, when accessing from Web browser 200 through the Internet 300 to Web server 400, the connection is established through the keyword restriction facility 100, whereby it is beneficial that no bypass path exists.

Keyword restriction facility 100 meets this criterion as long as it is installed between Web browser 200 and the Internet 300 in the network system. Thus, the keyword restriction facility 100 is not dependent on the hardware, as long as network traffic that is to be processed passed through keyword restriction facility 100. Namely, keyword restriction facility 100 may be provided as a service of Internet Service Provider (ISP) or as a function of a router or proxy server that is used for connecting the client machine to the Internet 300. Moreover, it may be embedded as a function of the Operating System (OS) of the client machine or the Web browser 200. In addition, it may be implemented as independent application software run on the client machine.

Keyword restriction facility 100 comprises relay processing section 10 for relaying communication between Web browser 200 and the Internet 300 and monitoring and controlling transmitted information sent from Web browser 200, response file retaining database 20 for retaining contents files (i.e., server responses) Web browser 200 receives; and restricted word database 30 for registering words that restrict transmission (hereinafter called restricted words).

As with a normal proxy, relay processing section 10 relays all communications when web browser 200 connects to the Internet 300. Namely, all of the request messages sent from Web browser 200 to Web server 400 and server responses sent from Web server 400 to web browser 200 are transferred by way of relay processing section 10. Relay processing section 10 refers to response file retaining database 20 and restricted word database 30 to inspect whether the request message sent from Web browser 200 to Web server 400 includes the restricted words and cancels transmission of any request message that includes the restricted words. Also, relay processing section 10 relays the response files sent from Web server 400 to send them to Web browser 200 as well as to response file retaining database 20.

Response file retaining database 20 is similar to a database for retaining response files that are provided in a normal proxy and stores response files received from relay processing section 10. Furthermore, in this embodiment of the present invention, this database 20 serves as a corresponding information database for storing corresponding relations between codes that are included in and dependent on HTML documents of response files (i.e., attribute names of elements in a form) and their attribute values, as described later.

Restricted word database 30 is a database where restricted words are registered that are restricted from being sent to the Internet 300. According to this, transmission of a request message sent from Web browser 200 is canceled when it includes a word registered with restricted word database 30 or information corresponding to this word.

Relay processing section 10 described above is implemented by a program controlling the hardware in which keyword restriction facility 100 is constructed, wherein the hardware includes one or more Central Processing Units (CPUs) of the, for example, proxy server or client machine, a processor of the router. This program may be stored in a magnetic disk or optical disk, semiconductor memory, or other storage media or may be transmitted via a network. Response file retaining database 20 and restricted word database 30 may be implemented using a storage medium such as a cache memory or magnetic disk drive.

Figure 2:
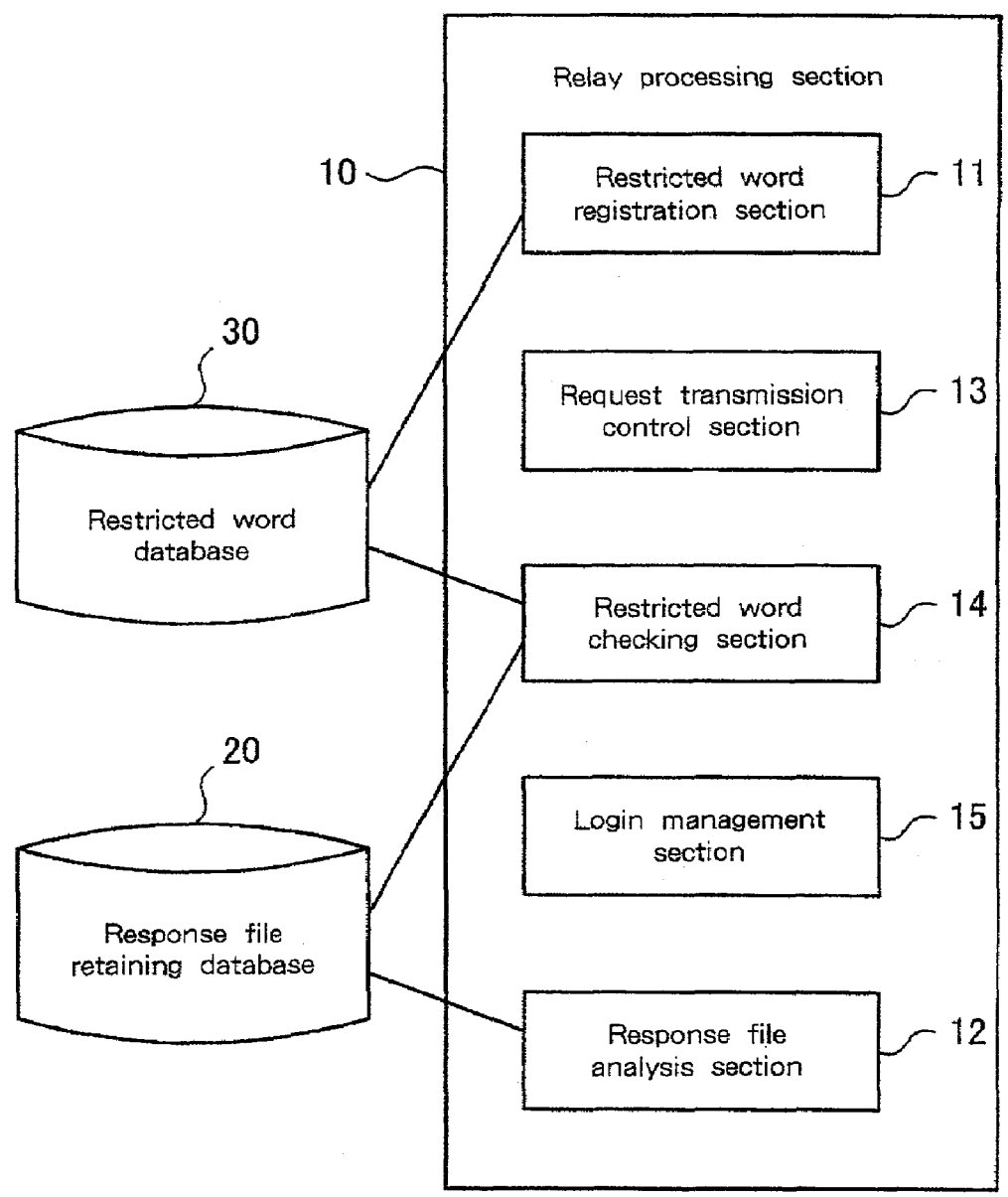
FIG. 2 depicts a configuration of relay processing section 10 according to an embodiment of the present invention.

FIG. 2 depicts a configuration of relay processing section 10. With reference to FIG. 2, relay processing section 10 comprises restricted word registration section 11 for registering restricted words with restricted word database 30, response file analysis section 12 for analyzing response files sent from Web server 400 and storing in response file retaining database 20, request transmission control section 13 for receiving request messages sent from Web browser 200 to inspect whether restricted words are contained and performing necessary processing, restricted word checking section 14, and login management section 15. Illustratively, these components may be provided as a module of a program that implements relay processing section 10. Now an exemplary operation of the embodiment will be described in accordance with illustrative functions of each component.

Figures 3, 4:
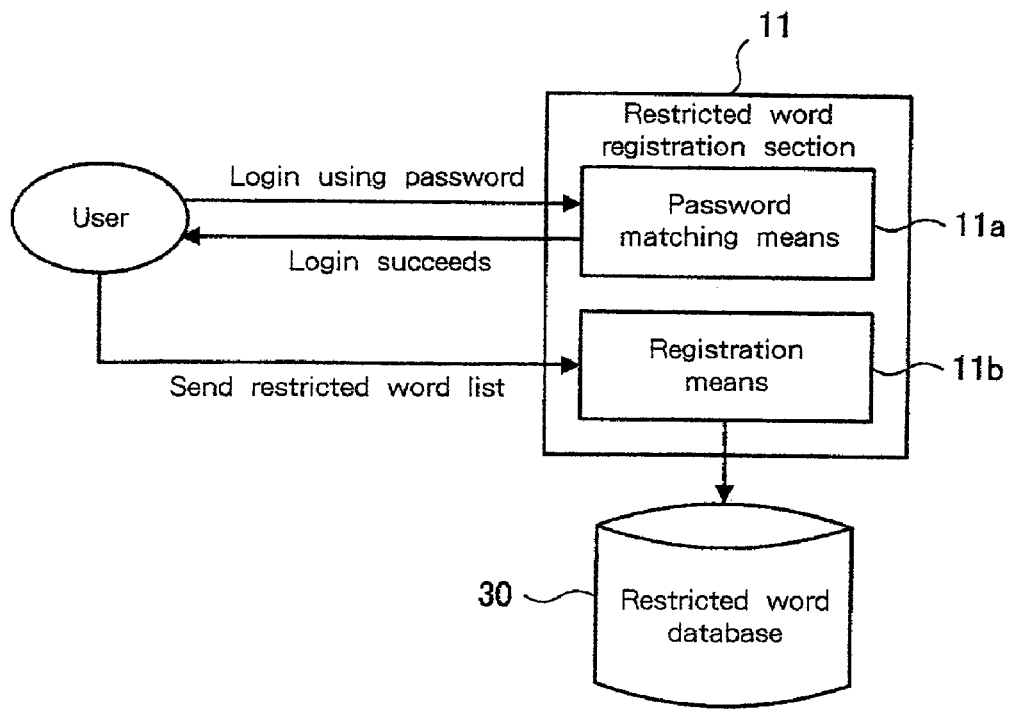
FIG. 3 depicts a diagram illustrating a function of restricted word registration section 11 according to an embodiment of the present invention.
FIG. 4 depicts an example of a list of restricted words used in the embodiment of the present invention.

FIG. 3 depicts a diagram illustrating a function of restricted word registration section 11. It is assumed that restricted words are registered by a particular user who has administrative authority. Accordingly, restricted word registration section 11 comprises password matching means 11a for verifying whether a user has administrative authority and registration means 11b for registering restricted words. When registering a restricted word, a user having administrative authority first logs in by inputting a password. Then, restricted word registration section 11 performs password matching using password matching means 11a. If the password is approved and login succeeds, the user inputs a list of restricted words. Restricted word registration section 11 stores the list of restricted words in restricted word database 30 using registration means 11b.

FIG. 4 depicts an example of a list of restricted words. Restricted words may be set individually for each user or may be set as the default restricted words common to all users. Also, a plurality of restricted words may be set for each user. For example, in the shown example, a user with user ID "aaa" has words "Yamato City Tyuorinkan Shimotsuruma" and "1234567890" as restricted words, while a user with user ID "bbb" has words "Kanagawa Tyuorinkan" and "0123456" as restricted words.

Upon transmission of a request message, the transmission of the request message may be canceled if only one of restricted words presented in the list appears in the request message or if more than certain number of restricted words appear in the list. Furthermore, since a destination (i.e., URL) of a request message is known by referring to the request message, it is possible to switch the restricted words depending on the destination provided that restricted words are set individually for each destination in restricted word database 30. In addition, by setting different restricted words corresponding to specific time zones, it is possible to use corresponding restricted words depending on the time zone in which the request message is issued.

Moreover, rather than using specific words described above as restricted words, the length of character strings may be set as restricted information. According to such a setting, when a certain length of character strings such as an address is included in the request message, transmission of that information is able to be prohibited.

In addition, constant numeric values may be set as restricted information. In this case, the numeric values that are set may be the numeric values themselves to be input or may be the number of digits of numeric values to be input. For instance, when a numeric value that is greater (or smaller) than or equal to the set numeric value or a numeric value that is greater (or smaller) than the set value is included in the request message, transmission of that request message may be canceled. According to such a setting, restriction based on numeric values becomes possible such that shopping over a fixed price is prohibited.

Figures 5, 6:
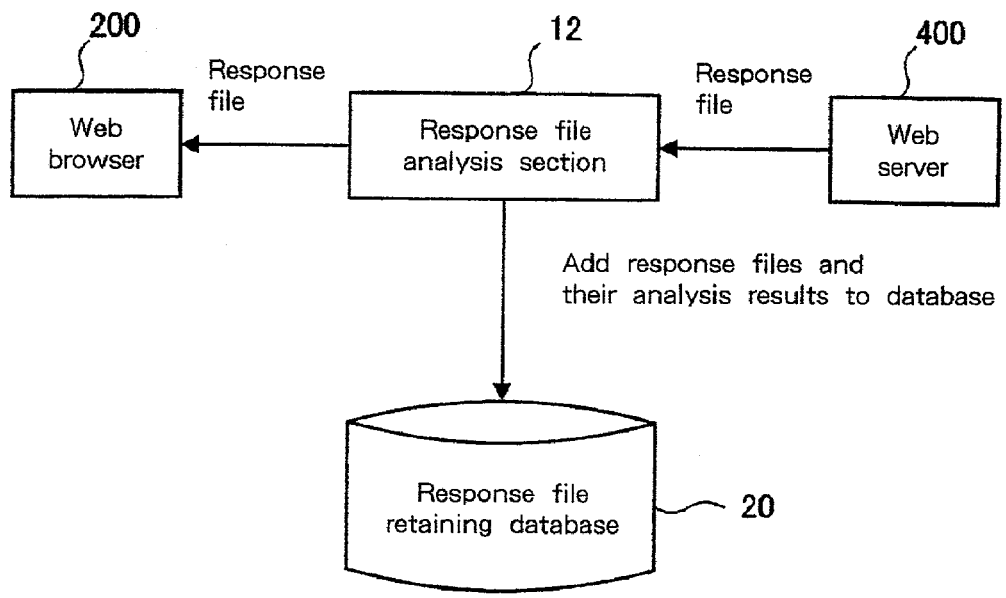
FIG. 5 is a diagram illustrating response file analysis section 12 according to an embodiment of the present invention.
FIG. 6 depicts an example of a form portion detected in the HTML document according to an embodiment of the present invention.

FIG. 5 is a diagram illustrating response file analysis section 12 and its exemplary connections to Web browser 200, Web server 400, and response file retaining database 20. Response file analysis section 12 receives response files sent from Web server 400 via the Internet 300 in response to requests sent from Web browser 200 of the client machine. Then, the response file analysis section 12 sends received response files to Web browser 200 as well as analyzes the contents of HTML documents of response files and stores the response files and analysis results in response file retaining database 20.

An analysis of HTML documents, in accordance with one embodiment, is performed as follows. First, a FORM tag is detected in the HTML document of the response file. Then, a corresponding table is created that represents corresponding relations between attribute names and attribute values defined in this form by using the information made by appending the URL of the HTML document to an ACTION attribute of the detected FORM tag as the key. This corresponding table is stored in response file retaining database 20 as the analysis result of the HTML document.

Now it will be described about the analysis of the HTML document in detail by way of a concrete example. FIG. 6 depicts an example of a form portion, enclosed between the "FORM" tag and the "/FORM" tage, which is detected in the HTML document. It is assumed that the form shown in FIG. 6 is contained in the HTML document whose URL is http://abc/index.html.

When detecting the form shown in FIG. 6 in the HTML document of http://abc/index.html, response file analysis section 12 creates a corresponding table of attributes in this form. The corresponding table is composed of a detail table that associates attribute names with attribute values in the form, and a form reference table that associates the detail table with the HTML document that includes the form.

Response file analysis section 12 generates a form ID "abc/address.cgi" specifying this form based on the form shown in FIG. 6 by appending the site name of the URL, "abc", to an ACTION attribute of the FORM tag, "address.cgi". Then, it determines the name of the detail table regarding this form and associates it with the form ID. It is noted that the form ID is not limited to the above example but may be any information as long as it is possible to specify to which HTML document the form belongs.

Figure 7A:
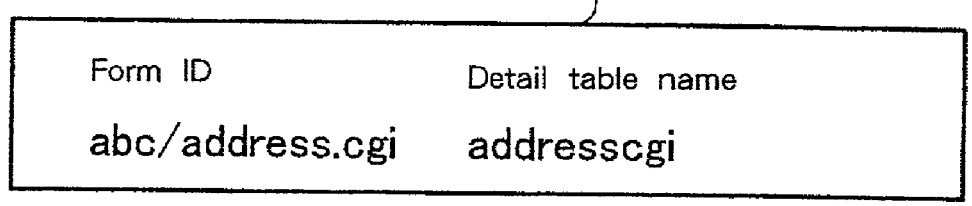

FIG. 7(a) depicts a form reference table 21 created based on the form shown in FIG. 6. In the form reference table 21 shown in FIG. 7(a), the detail table name corresponding to the form ID "abc/address.cgi" is determined as "addresscgi".

Figure 7B:
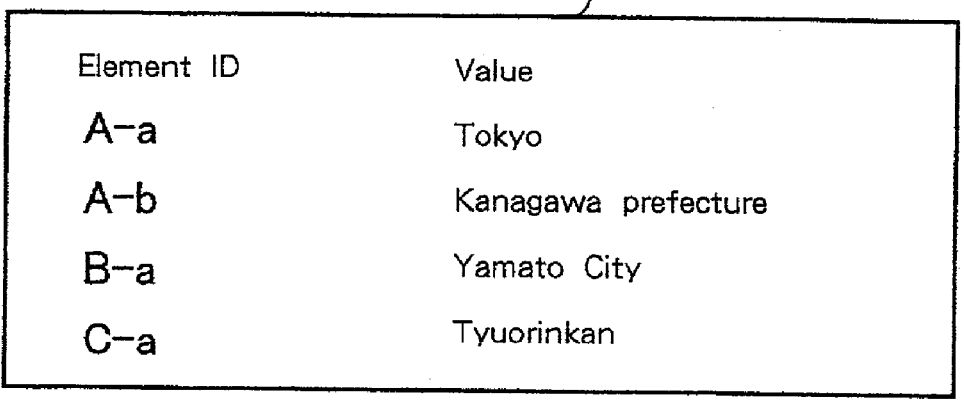
FIG. 7(b) depicts a detail table 22.

FIG. 7(b) depicts a detail table 22 created based on the form shown in FIG. 6. In the detail table 22 shown in FIG. 7(b), an element ID "A-a" as attribute name is associated with an attribute value "Tokyo", element ID "A-b" is associated with an attribute value "Kanagawa prefecture", element ID "B-a" is associated with an attribute value "Yamato City", and element ID "C-a" is associated with an attribute value "Tyuorinkan", respectively.

Figure 8:
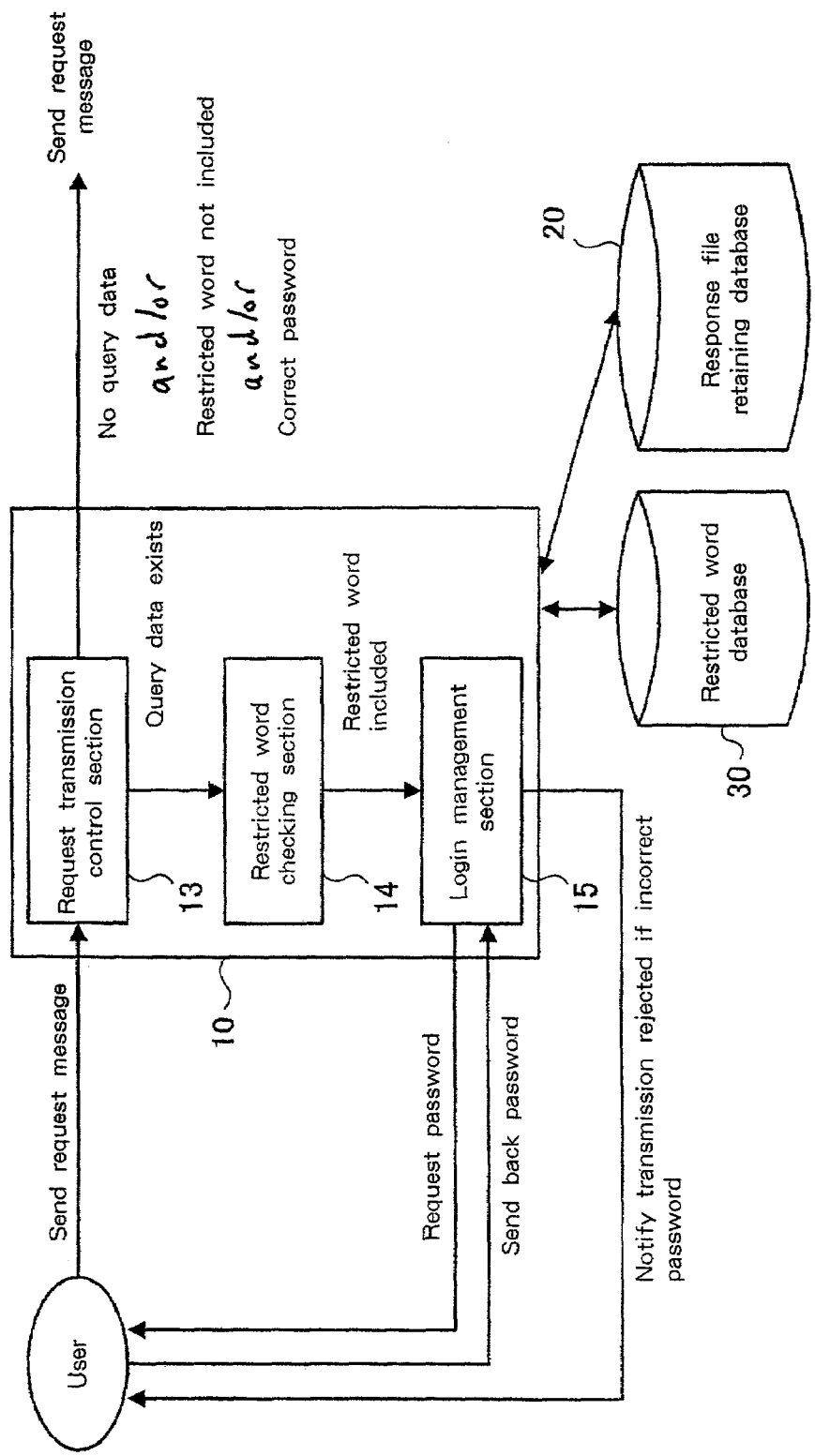
FIG. 8 is a diagram illustrating functions of request transmission control section 13, restricted word checking section 14, and login management section 15 according to an embodiment of the present invention.

FIG. 8 is a diagram illustrating illustrative functions of request transmission control section 13, restricted word checking section 14, and login management section 15. Request transmission control section 13 receives and analyzes request messages sent from Web browser 200 and inspects whether query data is included that is a code dependent on the HTML file. If the query data is included, it passes the query data to restricted word checking section 14 and waits for a reply, while if query data is not included, it sends the request message as it is.

Figure 9:
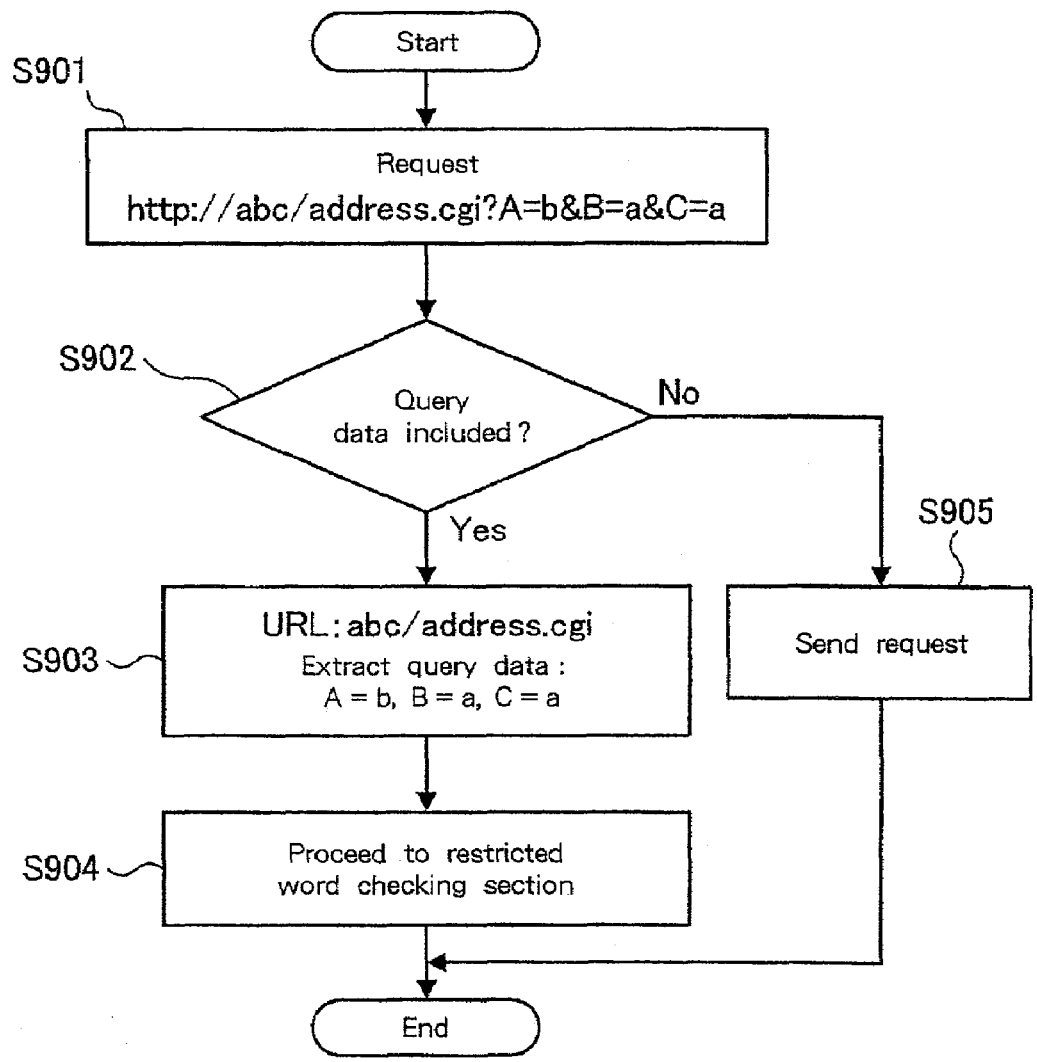
FIG. 9 is a flowchart illustrating processing performed by request transmission control section 13 according to an embodiment of the present invention.

FIG. 9 is a flowchart illustrating processing performed by request transmission control section 13. Referring to FIG. 9, request transmission control section 13 first receives a request message from Web browser 200 (step 901), wherein the request message is represented by "http://abc/address.cgi?A=b&B=a&C=a".

Next, request transmission control section 13 inspects whether the request message includes query data (step 902). If query data is not included, request transmission control section 13 transmits the request message (step 905), while if query data is included, then it extracts the URL representing the destination of the (request message and the query data (step 903). Here, the request message "http://abc/address.cgi?A=b&B=a&C=a" was input, thus "/abc/address.cgi" is extracted as the URL and "A=b", "B=a" and "C=a" are extracted as query data. When query data is extracted, request transmission control section 13 passes the extracted information to restricted word checking section 14 to perform processing for checking the restricted words (step 904).

Then, restricted word checking section 14 inspects whether the query data includes the restricted words as to the request message received from request transmission control section 13. If the restricted word is included, it notifies request transmission control section 13 that the transmission of the request message should be canceled, while if the restricted word is not included, it notifies request transmission control section 13 to transmit the request message.

Figure 10:
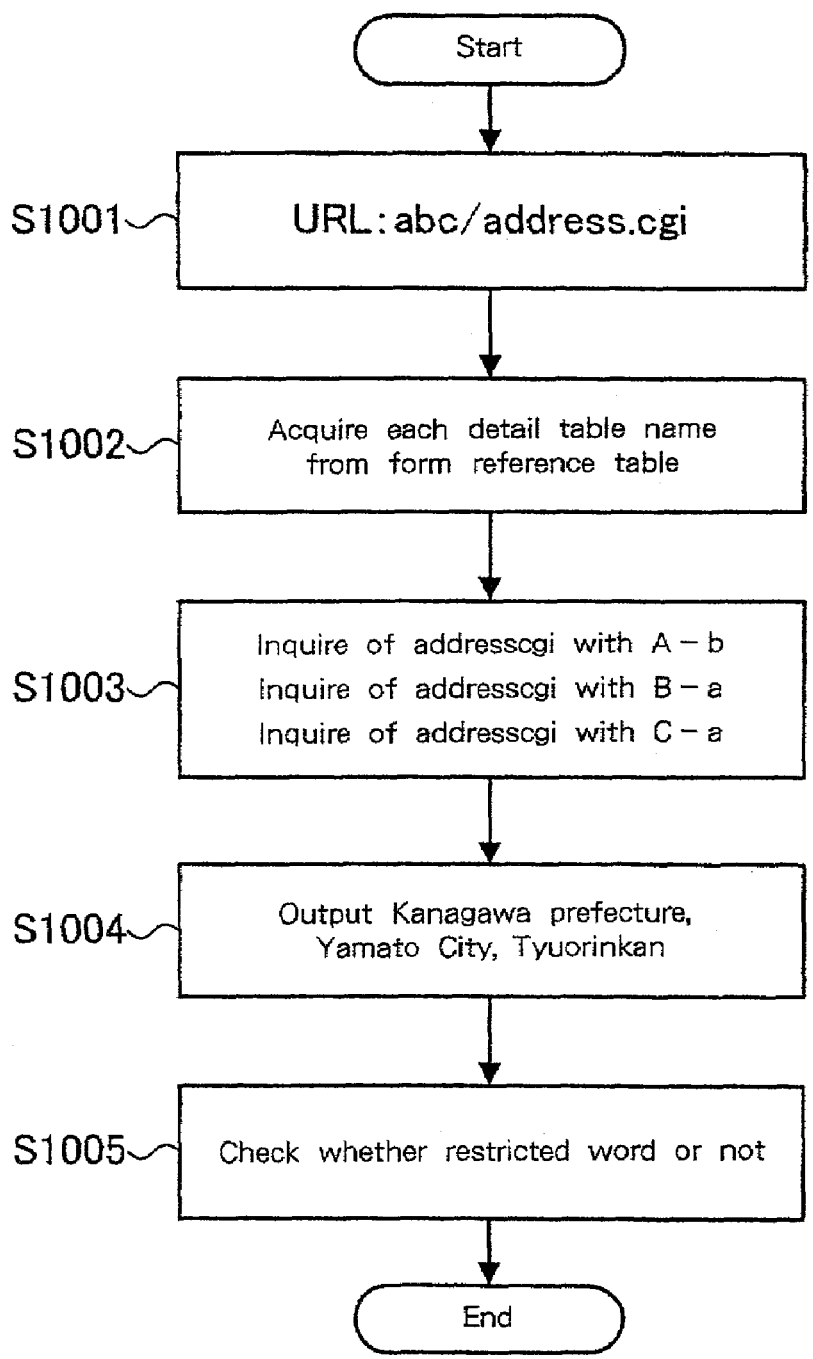
FIG. 10 is a flowchart illustrating processing performed by restricted word checking section 14 according to an embodiment of the present invention.

FIG. 10 is a flowchart illustrating processing performed by restricted word checking section 14. Referring to FIG. 10, restricted word checking section 14 first, based on the URL received from request transmission control section 13, acquires the detail table name corresponding to the URL from the form reference table 21 stored in the response file retaining database 20 (steps 1001, 1002). Here, the URL received from request transmission control section 13 is "abc/address.cgi". Thus, the detail table name "addresscgi" is obtained by referring to the form reference table 21 shown in FIG. 7(a).

Next, restricted word checking section 14 specifies the detail table 22 that is to be referenced by the detail table name obtained and then queries about query data received from request transmission control section 13 and acquires attribute values (steps 1003, 1004). Here, attribute values of three query data, i.e., "A=b", "B=a" and "C=a", are queried to the detail table "addresscgi". Referring to the detail table 22 shown in FIG. 7(b), one can acquire "Kanagawa prefecture" as an attribute value corresponding to "A=b", "Yamato City" as an attribute value corresponding to "B=a", and "Tyuorinkan" as an attribute value corresponding to "C=a", respectively.

Next, restricted word checking section 14 inspects whether these attribute values acquired are set as restricted words by referring to restricted word database 30 (step 1005). If these attribute values are set as restricted words, it notifies request transmission control section 13 that the transmission of the request message should be canceled, while if they are not set as restricted words, it notifies request transmission control section 13 to transmit the request message.

As described above, according to an embodiment of the present invention, corresponding relations between information used for query data of request messages (i.e., attribute names) and restricted words are recognized based on the contents of the HTML document in order to determine whether the request message includes information corresponding to the restricted words. According to this, even if a restricted word input by a user is replaced in the request message with another information, it is reliably determined whether that information corresponds to the restricted word.

As described above, various methods can be used to determine whether or not to allow transmission of request messages. Namely, in case that a plurality of restricted words are set, the transmission of the request message may be canceled if only one of the restricted words exists in the query data or if more than certain number of restricted words exist in the query data. Alternatively, by setting numeric values rather than using words as restricted words, it is also possible to cancel transmission of the request message that includes a numeric value greater than (or smaller than) or equal to those numeric values.

By the way, in case of setting restricted words individually for each user, transmission of a request message should be canceled only when query data in the request message corresponds to the restricted words set for a user who input information about that request message. That is, there may be a case where a predetermined word is a restricted word for some user but is not a restricted word for other users. In this case, even when those other users input that word, transmission of the request message based on such an input should not be canceled. In other words, those other users have authority to transmit as to that word. Therefore, there is a need for means to specify a user who input information for request messages. According to the embodiment of the present invention, this control is performed in login management section 15.

Referring to FIG. 8, login management section 15 requires a password to a user via Web browser 200 when restricted word checking section 14 determines that query data in the request message includes restricted words. After the user sends back the password in response to this request, login management section 15 specifies the user based on the password and inspects whether the restricted word that was determined to be included in the query data corresponds to the restricted word set for the user, i.e., whether the user has authority to transmit the restricted word.

If determined that it is not the restricted word set for the user (i.e., the user has authority to transmit), login management section 15 notifies request transmission control section 13 to transmit the request message. On the other hand, if determined that it is the restricted word set for the user (i.e., the user does not have authority to transmit), login management section 15 notifies request transmission control section 13 to cancel the transmission of the request message. Also, it notifies the user that the transmission of the request message has been rejected.

Furthermore, login management section 15 needs to release the login condition by requiring a user to logout or by automatically logging a user out when certain conditions are fulfilled (for example, no input has been input for a certain period of time or no request message has been sent). This is necessary to require login again when a user of the client machine has changed, in order to avoid using the corresponding tables of restricted words corresponding to the previous user.

In case of using the default restricted words common to all users rather than setting the restricted words individually for each user, then login management section 15 and its processing for authenticating a user as described above are unnecessary although may be added if desired. A method for authenticating a user is not limited to a method for requiring a password as described above, but various methods can be used, including methods dependent on a user who logs into the OS, such as voice recognition. Furthermore, as to a method for requiring a password or a method for requiring logout, various methods can be used such as a method that displays a dialog box on a display of the client machine or a method that performs notification using a voice, as well as a method that is performed via Web browser 200 as described above.

After request transmission control section 13 determines that the received request message includes query data and waits for a reply from restricted word checking section 14, if it receives notification from restricted word checking section 14 or login management section 15 that the request message should be transmitted, it transmits the request message. On the other hand, if it receives notification from restricted word checking section 14 or login management section 15 that the transmission of the request message should be canceled, it cancels the transmission of the request message.

When the transmission of the request message is canceled, it is preferable to inform a user of the transmission having been rejected by means of, for example, displaying an error message on a display of the client machine.

Keyword restriction facility 100 described above is generally installed between Web browser 200 and the Internet 300 (conceptually between a user and an external network), thus it is implemented on various kinds of hardware such as an ISP, proxy server, router, or client machine. When implemented on the client machine, keyword restriction facility 100 may be implemented as an independent application program as well as embedded as a function of the Web browser or OS.

When keyword restriction facility 100 is embedded in the client machine as a function of the OS, it becomes possible not only to restrict the transmission of the request message, but also to avoid using inappropriate words in all applications. Moreover, as mentioned above, login information may also be used to specify a sender of the request message.

Figure 11:
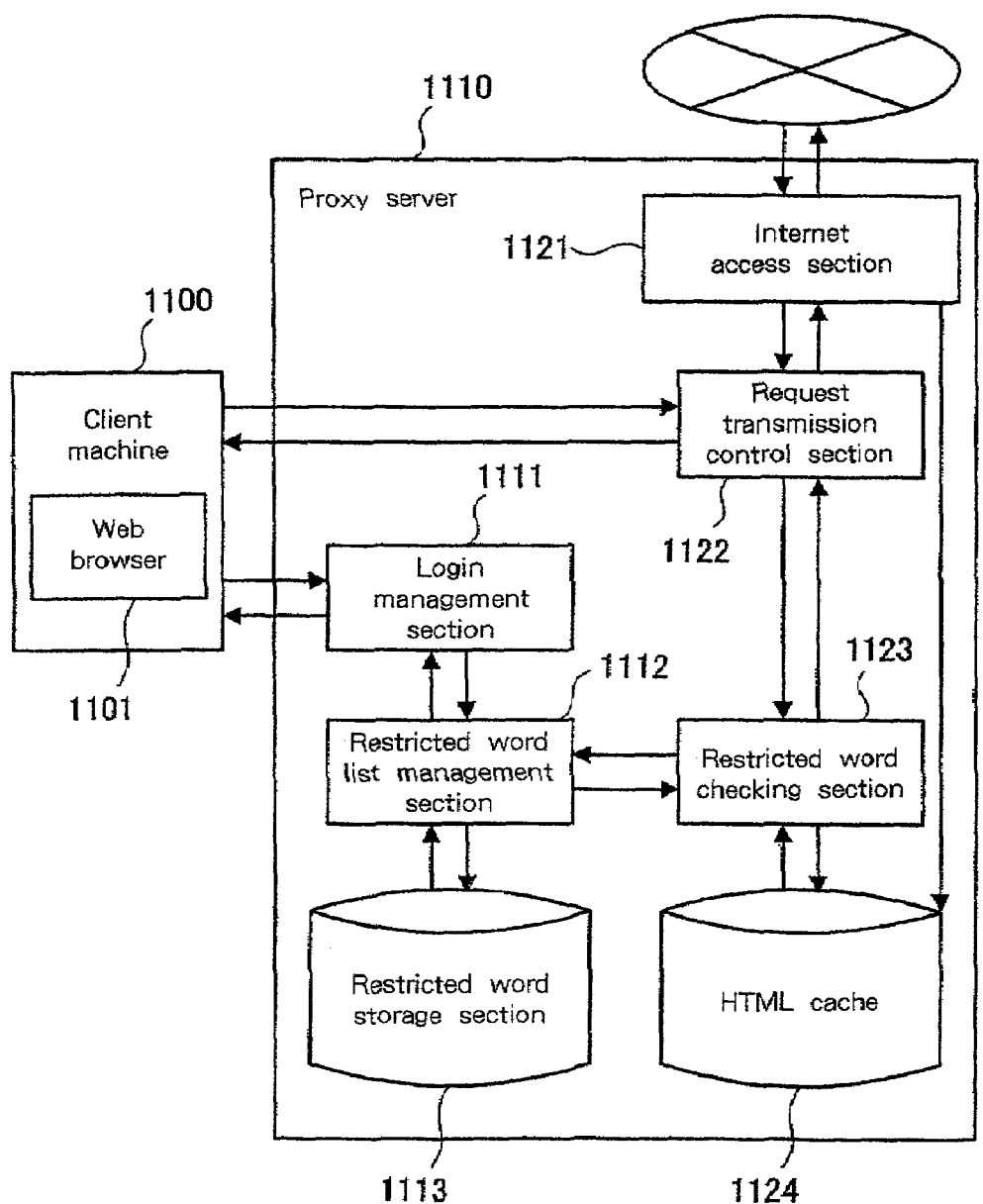
FIG. 11 depicts a configuration example where keyword restriction facility is implemented on the proxy server according to an embodiment of the present invention.

Now an example will be described in which keyword restriction facility is implemented on a proxy server. FIG. 11 depicts a configuration example where keyword restriction facility is implemented on the proxy server. It is noted that there is shown only one client machine 1100 in FIG. 11, however, there may be actually a plurality of client machines 1100 connected to the Internet 300 via proxy server 1110. Also, in FIG. 11, there is only shown a configuration relating to transmission control processing of request messages, wherein restricted word registration section 11 shown in FIG. 2 is omitted. In FIG. 11, Internet access section 1121 has a function corresponding to response file analysis section 12 shown in FIG. 2, HTML cache 1124 corresponds to response file retaining database 20 shown in FIG. 2, restricted word list management section 1112 and restricted word storage section 1113 correspond to restricted word database 30 shown in FIG. 2. Login management section 1111, request transmission control section 1122 and restricted word checking section 1123 are the same as login management section 15, request transmission control section 13 and restricted word checking section 14 shown in FIG. 2, respectively.

Figure 12:
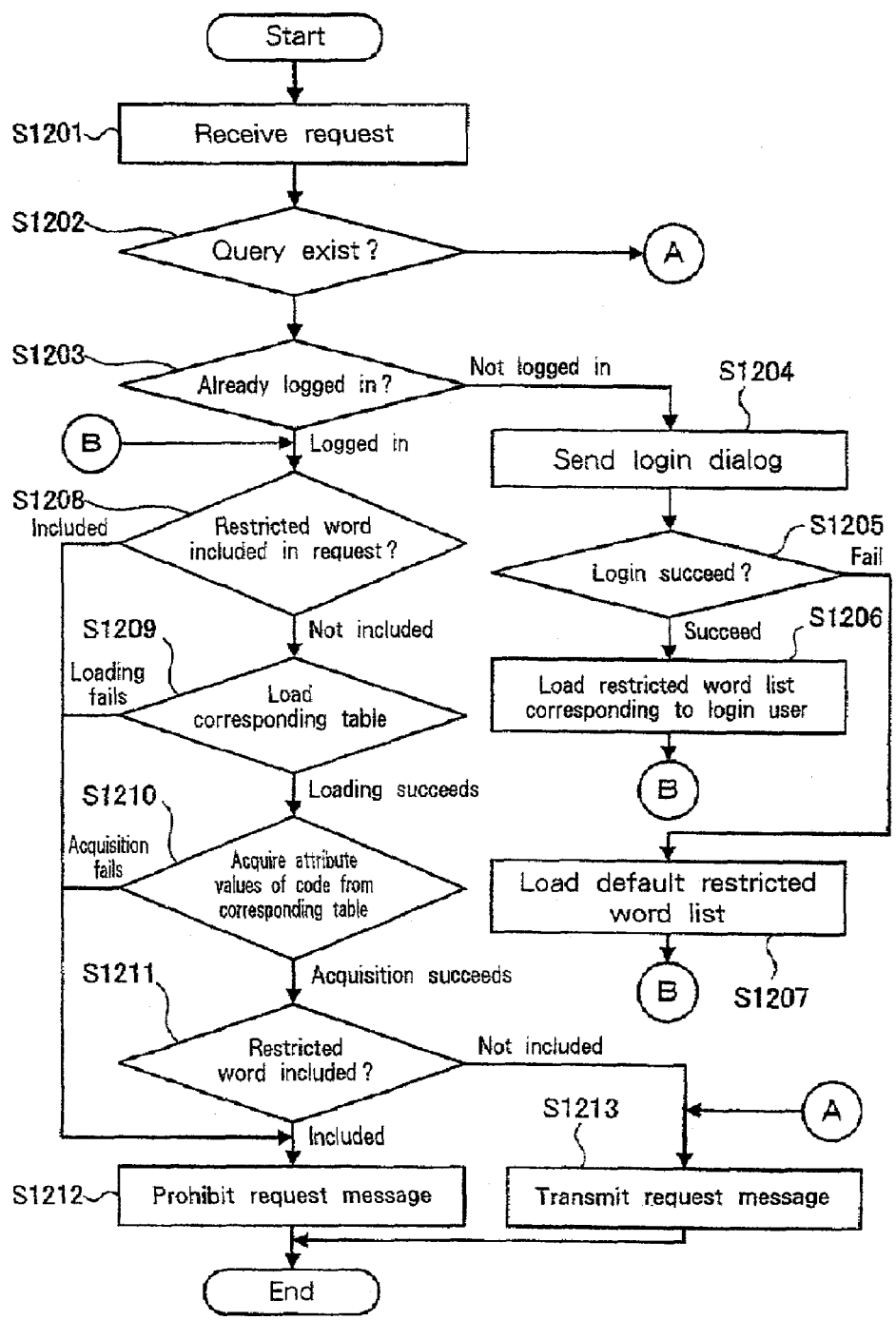
FIG. 12 is a flowchart illustrating operations of keyword restriction facility implemented on the proxy server 1110 shown in FIG. 11.

FIG. 12 is a flowchart illustrating operations of keyword restriction facility implemented on the proxy server 1110. With reference to FIG. 11 and FIG. 12, it will be described about processing for transmission of request messages performed by client machine 1100.

It is assumed in an initial state that a predetermined HTML document has been received over the Internet 300 and displayed in Web browser 1101 on the client machine 1100. Accordingly, the HTML document has been analyzed by the function in Internet access section 1121 corresponding to response file analysis section 12 and stored in HTML cache 1124 along with analysis results.

When a request message is sent from Web browser 1101 of the client machine 1100, request transmission control section 1122 receives the request message and inspects whether it includes query data (steps 1201, 1202). If query data is included, it extracts and passes the query data to restricted word checking section 1123 along with information corresponding to a form ID (e.g., URL of destination) that specifies a contents file based on which the request message was transmitted.

Then, restricted word checking section 1123 makes inquiries to restricted word list management section 1112 for the purpose of making a check using a restricted word list corresponding to a user who sent the request message. Then, restricted word list management section 1112 makes inquiries to login management section 1111 to check whether login has been performed in order to specify a user who sent the request message (step 1203). If login has not been performed, login management section 1111 sends a login dialog to the client machine 1100 (step 1204).

When login is performed using a correct password responsive to this login dialog, restricted word list management section 1112 loads a restricted word list corresponding to a user specified by the login from restricted word storage section 1113 and passes it to restricted word checking section 1123 (steps 1205, 1206). On the other hand, if login has not been normally performed, restricted word list management section 1112 loads a default restricted word list from restricted word storage section 1113 and passes it to restricted word checking section 1123 (steps 1205, 1207).

Then, restricted word checking section 1123 makes reference to the restricted word list received from restricted word list management section 1112 and inspects whether restricted words are included in query data of the request message subject to processing (steps 1208). If the restricted word is included, it notifies request transmission control section 1122 to cancel the transmission of the request message immediately. Upon receipt of this notification, request transmission control section 1122 cancels the transmission of the request message (step 1212).

In step 1208, if it is determined that the restricted words are not included in query data of the request message, then restricted word checking section 1123 loads a corresponding table corresponding to the request message from HTML cache 1124 (step 1209). If the table fails to load, restricted word checking section 1123 notifies request transmission control section 1122 to cancel the transmission of the request message immediately. Upon receipt of this notification, request transmission control section 1122 cancels the transmission of the request message (step 1212).

In step 1209, if a desired corresponding table is successfully loaded, then restricted word checking section 1123 acquires attribute values of the code (i.e., character strings displayed in Web browser 1101) in query data of the request message subject to processing using the corresponding table (step 1210). If failing to acquire the character strings, restricted word checking section 1123 notifies request transmission control section 1122 to cancel the transmission of the request message immediately. Upon receipt of notification, request transmission control section 1122 cancels the transmission of the request message (step 1212).

In step 1210, if a desired character string has been acquired, then restricted word checking section 1123 makes reference to the restricted word list received from restricted word list management section 1112 and inspects whether restricted words are included in the character strings acquired (steps 1211). If the restricted word is included in the character strings, restricted word checking section 1123 notifies request transmission control section 1122 to cancel the transmission of the request message. If the restricted word is not included in the character strings, restricted word checking section 1123 notifies request transmission control section 1122 to transmit the request message.

Upon receipt of notification of canceling the transmission, request transmission control section 1122 cancels the transmission of the request message (step 1212), while it transmits the request message upon receipt on notification of allowing the transmission (step 1213).

While an embodiment has been shown where keyword restriction facility is implemented on the proxy server 1110, it is conceivable that login management section 1111, restricted word list management section 1112, and restricted word storage section 1113 are implemented on one hardware, while Internet access section 1121, request transmission control section 1122, restricted word checking section 1123, and HTML cache 1124 are implemented on another hardware, wherein both of the hardware are connected via a network.

While the embodiments described above are illustrated as a case where the contents file (i.e., Web page) is an HTML document, the present invention is also applicable where the contents file is described using other languages, such as XML, which are used to describe the Web-based contents.

As mentioned above, according to the present invention, it is possible to reliably prevent a request message from being transmitted that includes a word whose transmission is restricted, by analyzing HTML documents received from a server and determining whether the information to be transmitted includes the word whose transmission is restricted using the analysis information.

To summarize, in order to overcome the problems of the prior art, in a first aspect of the present invention, there is provided a transmission control system being comprised as follows. That is, the transmission control system according to the present invention comprises a restricted word database for storing restricted words that are set to restrict transmission; a request transmission control section for relaying a request message sent from a Web browser to an external network and inspecting whether the request message includes a code that is dependent on a source file of a Web page displayed on the Web browser; and a restricted word checking section for analyzing the code using related portions of the code described in the source file when the request message includes the code, and determining whether or not to allow transmission of the request message depending on whether an analysis result of the code corresponds to the restricted words stored in the restricted word database, wherein the request transmission control section controls the transmission of the request message according to the determination of the restricted word checking section.

The code described above is, for example, an attribute name defined in the form, which is included in query data in the request message. The analysis of this code is performed based on the source file of the Web page displayed in the Web browser, which is acquired when the web browser issues the request message.

Alternatively, the source file may be analyzed in advance in order to acquire and store information about this code. In this case, the aforementioned transmission control system further comprises a corresponding information database for storing information about corresponding relations between the code extracted from the source file of the Web page displayed in the Web browser and attribute values of the code, wherein the restricted word checking section analyzes the code based on information about the corresponding relations stored in the corresponding information database.

Furthermore, the transmission control system comprises a response file analysis section for acquiring a source file of a Web page sent back from a predetermined server responsive to a request from the Web browser, and extracting corresponding relations between the code in the source file and attribute values of the code and storing in the corresponding information database.

Furthermore, the transmission control system comprises a login management section for specifying a user who has logged into the Web browser, wherein the restricted word database stores the restricted words that are set individually for each user who uses the Web browser, and wherein the restricted word checking section acquires information about the restricted words set for a user specified by the login management section from the restricted word database and matches the information with the analysis result of the code.

According to this, the transmission control is accomplished meticulously by setting different restricted words for each user.

Furthermore, in the transmission control system described above, the restricted word database stores the restricted words that are set individually depending on a destination of the request message, wherein the restricted word checking section acquires information about the restricted words corresponding to the destination of the request message sent from the Web browser from the restricted word database and matches the information with the analysis result of the code.

According to this, the transmission control is accomplished meticulously by setting different restricted words for each destination of the request message.

Furthermore, in the transmission control system described above, the restricted word database stores plural kinds of the restricted words that are set corresponding to time zones specified, wherein the restricted work checking section acquires information about corresponding restricted words from the restricted word database depending on the time zone, in which the request message is sent from the Web page, and matches the information with the analysis result of the code.

According to this, the transmission control is accomplished meticulously by setting different restricted words depending on the time zone in which the request message is issued.

In another aspect of the present invention, there is provided a server for receiving a request message sent from a client machine and performing relay processing and sending to an external network, the server comprising a request transmission control section for receiving the request message and inspecting whether the request message includes a code that is dependent on a source file of predetermined contents; and a restricted word checking section for analyzing the code using related portions of the code described in the source file when the request message includes the code, and determining whether or not to allow transmission of the request message depending on whether an analysis result of the code corresponds to restricted words that are set to restrict the transmission, wherein the request transmission control section controls the transmission of the request message according to the determination of the restricted word checking section.

This server may be configured as a proxy server or ISP. In addition, a router is also included in this server, which is used to access the external network from the internal network to which the client machine is connected. According to this, the transmission control is performed reliably for the request messages sent from all the client machines on the internal network connected to this server.

Now this server is able to perform the transmission control described above by acquiring information about corresponding relations between the code extracted from the source file of the contents and attribute values of the code from the database on the network (i.e., internal network).

Alternatively, this server may have such a database. In this case, this server comprises a corresponding information database for storing information about corresponding relations between the code extracted from the source file of the contents and attribute values of the code; and a response file analysis section for acquiring a source file of a web page sent back from a predetermined server responsive to a request from the client machine, and extracting corresponding relations between the code in the source file and attribute values of the code and storing in the corresponding information database, wherein the restricted word checking section analyzes the code based on information about the corresponding relations stored in the corresponding information database.

The server further comprises a login management section for specifying a user who has sent the request message from the client machine; and a restricted word database for storing the restricted words that are set individually for each user who uses the client machine, wherein the restricted word checking section acquires information about the restricted words set for a user specified by the login management section from the restricted word database and matches the information with the analysis result of the code.

According to this, the transmission control is accomplished meticulously by setting different restricted words for each user. A way to specify a user is, for example, to prompt a user to login directly by requiring a password or to use login information for the OS of the client machine.

In a further aspect of the present invention, there is provided a terminal station connected to an external network and equipped with display means of Web pages, the terminal station comprising request message analysis means for inspecting whether a request message generated according to a form of the Web page includes a code that is dependent on a source file of the Web page; and request message transmission control means for analyzing the code using related portions of the code described in the source file when the request message includes the code, and controlling transmission of the request message depending on whether an analysis result of the code corresponds to control information that is set to restrict the transmission.

In order to implement such a function in the terminal station, it may be embedded as a function of the Web browser or OS, or it may be implemented as an independent application program.

Furthermore, the terminal station comprises sender specifying means for specifying a sender of the request message, wherein the request message transmission control means controls the transmission of the request message based on the restricted information that is set for the specified sender among the restricted information set for each user of the terminal station.

In a further aspect of the present invention, there is provided a transmission control method of a request message generated according to a form of a Web page, the method comprising the steps of: inspecting whether the request message includes a code that is dependent on a source file of the Web page; analyzing the code using related portions of the code described in the source file when the request message includes the code; and determining whether or not to allow transmission of the request message depending on whether an analysis result of the code corresponds to restricted information that is set to restrict the transmission.

Furthermore, the transmission control method of a request message comprises the step of specifying a sender of the request message, wherein the step of determining whether or not to allow transmission comprises the step of inspecting whether an analysis result of the code corresponds to the restricted information set for the specified sender.

In addition, in the transmission control method, the restricted information is set individually depending on a destination of the request message, wherein the step of determining whether or not to allow transmission comprises the steps of: extracting information about the destination of the request message; and inspecting whether an analysis result of the code corresponds to the restricted information set for the extracted destination.

Moreover, in the transmission control method, the restricted information is a length of character strings, wherein the step of determining whether or not to allow transmission comprises the step of comparing a length of a character string of an analysis result of the code with a length specified by the restricted information to determine whether or not to allow transmission of the request message.

Furthermore, in the transmission control method, the restricted information is a numeric value, wherein the step of determining whether or not to allow transmission comprises the step of comparing information about a number in an analysis result of the code with a numeric value specified by the restricted information to determine whether or not to allow transmission of the request message.

The information about the number in the analysis result of the code includes a numeric value itself or the number of digits of a numeric value.

In a further aspect of the present invention, there is provided a transmission control method of an HTTP request generated according to a form of an HTML file, the method comprising the steps of: analyzing the HTML file to derive and retain corresponding relations between a code dependent on the HTML file and its attribute values; acquiring the attribute values corresponding to the code based on the corresponding relations when the code is included as query data in the HTTP request; and controlling transmission of the request message depending on whether the attribute values acquired correspond to information that is set to restrict the transmission. In a further aspect of the present invention, there is provided a transmission control method of a message generated according to a form of a page displayed on a display device of a computer, the method comprising the steps of: inspecting whether the message includes a code that is dependent on a source file of the displayed page; and determining whether or not to allow transmission of the message depending on an analysis result of the code.

In a further aspect of the present invention, there is provided a program for causing a computer to perform predetermined functions. That is, this program causes a computer connected to an external network to perform the functions of: relaying a request message sent from a Web browser to an external network and inspecting whether the request message includes a code that is dependent on a source file of a Web page displayed on the Web browser; analyzing the code using related portions of the code described in the source file when the request message includes the code; and controlling transmission of the request message depending on whether an analysis result of the code corresponds to restricted information that is set to restrict the transmission.

This program further causes the computer to perform the functions of: acquiring a source file of a Web page sent back from a predetermined server responsive to a request from the Web browser; and extracting corresponding relations between the code in the source file and attribute values of the code and storing in a corresponding information database, wherein the function of analyzing the code analyzes the code based on information about the corresponding relations stored in the corresponding information database.

This program further causes the computer to perform the functions of specifying a user who has sent the request message from the Web browser, wherein the function of controlling transmission of the request message controls the transmission of the request message based on the restricted information that is set individually for the specified user.

In a further aspect of the present invention, there is provided a program for causing a computer connected to an external network to perform the functions of: acquiring a source file of a Web page sent back from a predetermined server responsive to a request from a Web browser; and extracting corresponding relations between a code that is included in and dependent on the source file and attribute values of the code and storing in a corresponding information database.

In a further aspect of the present invention, the present invention may be provided as a storage medium storing these programs or a program transmission apparatus for delivering these programs over a network. According to such a configuration, the transmission control according to the present invention is implemented on a computer that has loaded these programs.

It is to be understood that the embodiments and variations shown and described herein are merely illustrative of the principles of this invention and that various modifications may be implemented by those skilled in the art without departing from the scope and spirit of the invention.

What is claimed is:

1. A transmission control system comprising:
    a restricted word database adapted to store restricted words that are used to restrict transmission;
    a request transmission control section adapted to relay a request message sent from a Web browser to an external network and inspecting whether the request message includes a code that is dependent on a source file of a Web page displayed on the Web browser; and
    a restricted word checking section adapted to analyze the code using related portions of the code described in the source file when the request message includes the code, and to determine whether or not to allow transmission of the request message depending on whether an analysis result of the code corresponds to one or more of the restricted words stored in the restricted word database,
    wherein the request transmission control section controls the transmission of the request message according to the determination of the restricted word checking section.

2. The transmission control system according to claim 1, further comprising:
    an information database adapted to store information about corresponding relations between the code from the source file of the Web page displayed in the Web browser and attribute values of the code, wherein the restricted word checking section analyzes the code based on information about the corresponding relations stored in the corresponding information database.

3. The transmission control system according to claim 2, further comprising:
    a response file analysis section adapted to acquire a source file of a Web page sent back from a predetermined server responsive to a request from the Web browser, and to extract corresponding relations between the code in the source file and attribute values of the code and storing in the corresponding information database.

4. The transmission control system according to claim 1, further comprising:
    a login management section adapted to specify a user who has logged into the Web browser, wherein the restricted word database stores the restricted words for each user who uses the Web browser, and wherein the restricted word checking section acquires information about the restricted words set for a user by the login management section from the restricted word database and matches the information with the analysis result of the code.

5. The transmission control system according to claim 1, wherein the restricted word database stores the restricted words depending on a destination of the request message, and wherein the restricted word checking section acquires information about the restricted words, corresponding to the destination of the request message sent from the Web browser, from the restricted word database and matches the information with the analysis result of the code.

6. The transmission control system according to claim 1, wherein the restricted word database stores plural kinds of the restricted words that correspond to time zones, and wherein the restricted word checking section acquires information about corresponding restricted words from the restricted word database depending on the time zone in which the request message is sent from the Web page, and matches the information with the analysis result of the code.

7. The transmission control system according to claim 1 wherein the transmission control system is implemented as part of a server.

8. The transmission control system according to claim 7, further comprising:
  a corresponding information database adapted to store information about corresponding relations between the code from the source file of the contents and attribute values of the code; and
  a response file analysis section adapted to acquire a source file of a Web page sent back from a predetermined server responsive to a request from the client machine, and to extract corresponding relations between the code in the source file and attribute values of the Code and storing in the corresponding information database,
  wherein the restricted word checking section analyzes the code based on information about the corresponding relations stored in the corresponding information database.

9. The transmission control system according to claim 7, further comprising:
  a login management section adapted to specify a user who has sent the request message from the client machine; and a restricted word database adapted to store the restricted words that are set individually for each user who uses the client machine,
  wherein the restricted word checking section acquires information about the restricted words set for a user specified by the login management section from the restricted word database and matches the information with the analysis result of the code.

10. A terminal station connected to an external network and equipped with a means to display Web pages, the terminal station comprising:
  request message analysis means for inspecting whether a request message generated according to a form of the Web page includes a code that is dependent on a source file of the Web page; and
  request message transmission control means for analyzing the code using related portions of the code described in the source file when the request message includes the code, and controlling transmission of the request message depending on whether an analysis result of the code corresponds to control information that is set to restrict the transmission.

11. The terminal station according to claim 10, further comprising:
  sender specifying means for specifying a sender of the request message, wherein the request message transmission control means controls the transmission of the request message based on the restricted information that is set for the specified sender among the restricted information set for each user of the terminal station.

12. A transmission control method of a request message generated according to a form of a Web page, the method comprising the steps of:
  inspecting whether the request message includes a code that is dependent on a source file of the Web page;
  analyzing the code using related portions of the code described in the source file when the request message includes the code; and
  determining whether or not to allow transmission of the request message depending on whether an analysis result of the code corresponds to restricted information that is used to restrict the transmission, wherein one or more of said steps are performed by a processor.

13. The transmission control method according to claim 12, further comprising the step of specifying a sender of the request message, wherein the step of determining whether or not to allow transmission comprises the step of inspecting whether an analysis result of the code corresponds to the restricted information set for the specified sender.

14. The transmission control method according to claim 12, wherein the restricted information is set individually depending on a destination of the request message, wherein the step of determining whether or not to allow transmission comprises the steps of:
  extracting information about the destination of the request message; and
  inspecting whether an analysis result of the code corresponds to the restricted information set for the extracted destination.

15. The transmission control method according to claim 12, wherein the restricted information is a length of character strings, and wherein the step of determining whether or not to allow transmission comprises the step of comparing a length of a character string of an analysis result of the code with a length specified by the restricted information to determine whether or not to allow transmission of the request message.

16. The transmission control method according to claim 12, wherein the restricted information is a numeric value, wherein the step of determining whether or not to allow transmission comprises the step of comparing information about a number in an analysis result of the code with a numeric value specified by the restricted information to determine whether or not to allow transmission of the request message.

17. The transmission control method of claim 12 wherein the request is a HyperText Transmission Protocol (HTTP) request the source file is a HyperText Markup Language (HTML) file.

18. An article of manufacture, comprising:
  a computer readable storage medium having computer readable program code means embodied thereon, said computer readable program code means comprising:
  a step to relay a request message sent from a Web browser to an external network and inspecting whether the request message includes a code that is dependent on a source file of a Web page displayed on the Web browser;
  a step to analyze the code using related portions of the code described in the source file when the request message includes the code; and
  a step to control transmission of the request message depending on whether an analysis result of the code corresponds to restricted information that is set to restrict the transmission.

19. A storage medium for storing a computer-readable program executable by a computer, the program causing the computer to perform the functions of:

relaying a request message sent from a Web browser to an external network and inspecting whether the request message includes a code that is dependent on a source file of a Web page displayed on the Web browser;

analyzing the code using related portions of the code described in the source file when the request message includes the code; and controlling transmission of the request message depending on whether an analysis result of the code corresponds to restricted information that is set to restrict the transmission.

* * * * *